METHOD FOR FORMING CORNER CUSHIONS

Original Filed May 18, 1967 4 Sheets-Sheet 1

Inventor
John M. Carmody

Jan. 12, 1971 J. M. CARMODY 3,555,137

METHOD FOR FORMING CORNER CUSHIONS

Original Filed May 18, 1967 4 Sheets-Sheet 2

Inventor
John M. Carmody

Inventor
John M. Carmody

Inventor
John M. Carmody 3,555,137

METHOD FOR FORMING CORNER CUSHIONS

John M. Carmody, Palos Heights, Ill., assignor to Republic Packaging Corporation, Chicago, Ill., a corporation of Delaware Original application May 18, 1967, Ser. No. 639,365, now Patent No. 3,404,827, dated Oct. 8, 1968. Divided and this application July 26, 1968, Ser. No. 770,460
Int. Cl. B26d *3/08, 3/10, 7/10;* B29c *17/14*
U.S. Cl. 264—148 6 Claims

ABSTRACT OF THE DISCLOSURE

A method for forming corner cushions for shipping and/or storing. Three cutting members having V-shaped cutting edges are positioned about a length of material such that the members are radially displaced 120° from one another and in planes which are at an angle of 90° with respect to one another. The cutting members are moved in straight paths into the length of material at angles to the material longitudinal axis such that three faces are formed in the material which are at right angles relative to one another and which meet at a point. The cutting members are then displaced along the axis of the material and the cutting sequence repeated so as to form individual cushions having three-faced pointed tips on one end thereof and three-faced interior cavities on the other end thereof. Sets of cutting members can be used to simultaneously cut at points along the axis of the material. A sprue can be provided between the cushions to connect the cushions together to form a long length of connected cushions which can be removed individually as needed.

This application is a division of copending application S.N. 639,365, filed May 18, 1967, and now Pat. No. 3,404,827.

This invention relates to the method for making corner cushions for packaging articles in cartons for shipping and/or storage.

It has always been a problem to package, for shipping or storage, articles such as electronic instruments, cabinets, desks, appliances, as well as a whole host of other similar articles having a substantially rectangular or square-shape, in a fashion such that they are protected from damage. In the past, articles of this type have been packaged in innumerable different ways, however, in each case, the packaging has been generally unsatisfactory, for one reason or another. For example, in some cases, the shipping cartons were partially filled with a packing material such as shredded or wadded paper. Thereafter, the article was placed in the carton atop the packing material and additional packing material then stuffed into the carton about the sides and top of the article so that it was effectively cushioned, on all sides, within the carton. This method of packaging articles is tedious, time consuming and therefore costly and, furthermore, provides little protection for the articles. It is entirely unsatisfactory for packaging articles such as electronic instruments and the like which are quite delicate.

Recently, some articles such as electronic instruments, television sets and the like have been packaged in cartons, using pre-formed cushions of a resilient material such as rubber or expanded polystyrene. The cushions are formed to snugly fit completely about or partially over the top and bottom of the article, so that the article is enclosed within or effectively "sandwiched" between the cushions. The cushions also generally fit tightly in the carton, so that the cushions and the article both are securely retained within the carton. These pre-formed cushions generally provide a high degree of protection to the articles, however, they are relatively expensive since the cushions must be formed or molded to fit the articles. This necessitates the use of relatively costly molds. Also, being pre-formed to fit a particular article, the cushions cannot be used with other articles so that each cushion has an extremely limited application. Furthermore, these cushions are both inconvenient to ship and to store since they are relatively bulky.

It is an object of the present invention to provide improved methods for making corner cushions for packaging articles in cartons for shipping and/or storage.

Another object is to provide improved methods for making corner cushions of the described type wherein the cushions can be easily and inexpensively extrusion molded, and thereafter cut to desired shapes.

A still further object is to provide improved methods for making corner cushions of the described type wherein the cushions can be formed in a long length of a number of connected corner cushions for ease in shipping and/or storing them, and thereafter easily individually separated for use.

A still further object is to provide improved methods for making corner cushions of the described type wherein the cushions are made of a foamed polyethylene.

Still another object is to provide improved methods for making corner cushions of the described type having a three-faced interior cavity configuration which permits supporting at the corners of any substantially rectangular or square-shaped article, or other articles having a number of corners whereat the articles can be supported.

A still further object is to provide improved methods utilizing apparatus for cutting the corner cushions which is both simple in construction and in operation.

Still another object is to provide improved methods utilizing apparatus which is adapted to cut individual ones of the corner cushions from a long length of material, or alternatively, to pre-cut the material in a fashion such that a number of the corner cushions are connected together, in a longitudinal connected form, by a sprue or sprues between each of the corner cushions.

The invention accordingly comprises methods utilizing apparatus embodying features of construction, combination of elements, and arrangement of parts, and methods for making an article possessing the features, properties, and the relation of elements which will be exemplified in the article hereinafter described, and the scope of the invention will be indicated in the claims.

For a fuller understanding of the nature and objects of the invention, reference should be had to the following detailed description taken in connection with the accompanying drawings in which.

Similar reference characters refer to similar parts throughout the several views of the drawings.

Figure 1:
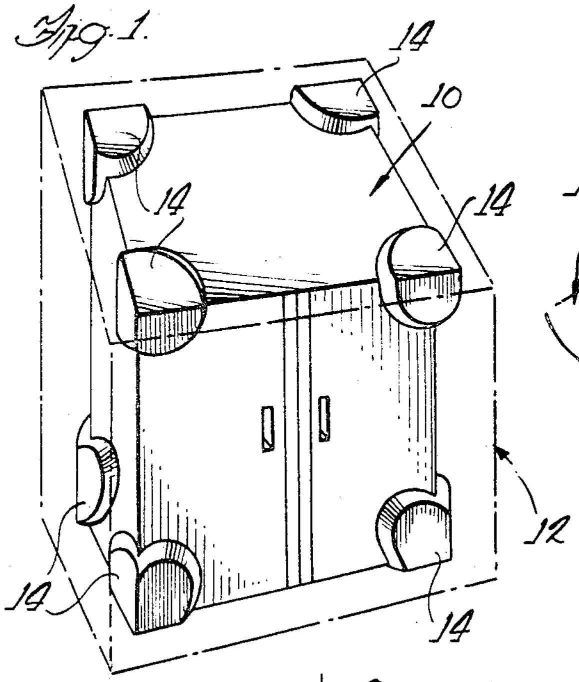
FIG. 1 is a perspective view, generally illustrating the manner in which the corner cushions are affixed to an article, to package the same in a carton for shipping and/or storage.
Figure 2:
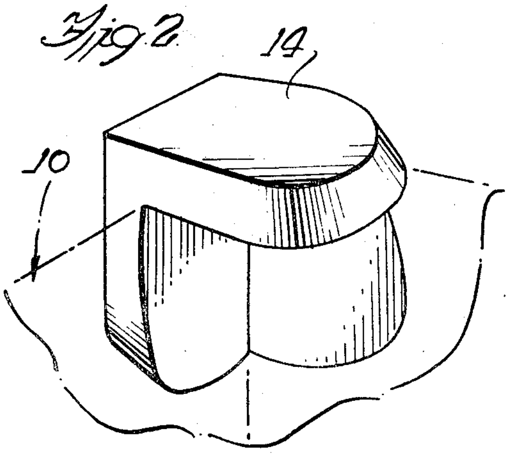
FIG. 2 is a perspective view of one of the corner cushions, and further illustrating the manner in which it is affixed to a corner of an article.
Figure 3:
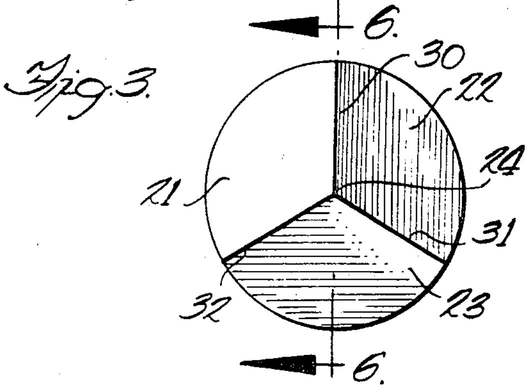
FIG. 3 is a front plan view of a corner cushion, illustrating the three-faced interior cavity formed therein.
Figure 4:
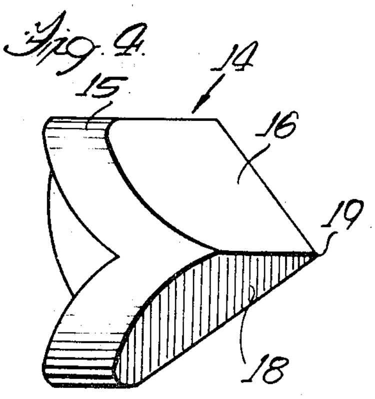
FIG. 4 is a side plan view of a corner cushion.
Figure 5:
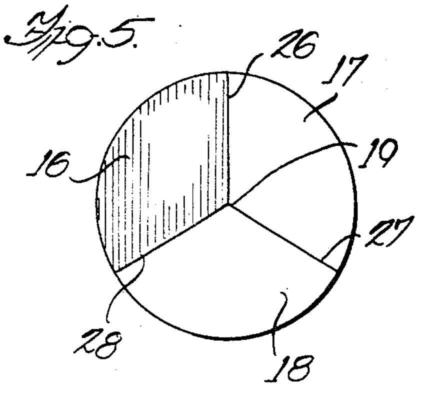
FIG. 5 is a rear plan view of a corner cushion.
Figure 6:
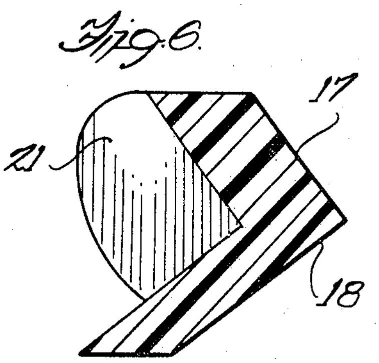
FIG. 6 is a sectional view of a corner cushion, taken along lines 6—6 of FIG. 3.

Referring now to the drawings, in FIG. 1 there is shown a cabinet 10 which is packaged within a carton 12 (illustrated in dot-dash lines) for shipping and/or storage, using a number of corner cushions 14 of the present invention. It can be seen that the corner cushions 14 support the cabinet 10, at each of its corners, in a substantially suspended position within the carton. As explained more fully below, the corner cushions 14 are formed of foamed polyethylene and are relatively strong and sturdy, but yet resilient, so that the cabinet 10 is both firmly and resiliently supported in this suspended position. Accordingly, the carton 12 can be dropped from a substantial height, without resulting damage to the cabinet 10.

More specifically, the corner cushions 14 are cut from a long length of extruded foamed polyethylene, which preferably has a density within a range of 1.8 to 2.6 lbs./cubic foot so as to provide a substantially strong, sturdy, firm but yet resilient corner cushion. Material of this density has been found to be satisfactory to provide a corner cushion which will firmly and resiliently support most articles against damage, when the corner cushions are formed in the manner described below. In cases of extremely heavy objects, material having a greater density, approximately 4 lbs./cubic foot, can be used.

The corner cushions 14, as can be best seen in FIGS. 2–6, have a body 15 which is illustrated to be of generally cylindrical shape, with three flat faces 16–18 (FIG. 5) on one end thereof which are tapered to a point 19, and with an interior cavity 20 in the opposite end thereof which likewise has three flat faces 21–23, which taper inwardly to a point 24. The body portion 15 also can be polygonal-shaped, for example, triangular or hexagonal, as exampled more fully below. The three faces 16–18 are radially spaced approximately 120° apart on the periphery of the body 15 and taper inwardly from the side wall of the cylinder to form the point 19, at the central axis of the body 15. The faces 16–18 each also can be in a plane so as to form right angles at their respective intersecting edges, indicated by the reference numerals 26–28. The three faces 21–23 of the interior cavity 20 likewise taper inwardly to form the point 24, at the central axis of the body 15, and are in planes so that their respective intersecting edges, indicated by the reference numerals 30–32, form right angles. The faces 16–18 on one corner cushion 14 and the faces 21–23 on another corner cushion can be advantageously simultaneously formed, as explained below.

The recessed interior cavity 20, that is, the faces 21–23 forming it, therefore substantially correspond to and form an inside corner which can be easily fitted about a corner on any rectangular or square-shaped article, such as the cabinet 10. The faces 16–18 on the opposite end of the corner cushions likewise substantially correspond to and form an outside corner, and therefore will seat within a corner of a carton, such as the carton 12. Accordingly, an article like the cabinet 10 is easily packaged within a carton for shipping and/or storage by, for example, affixing a corner cushion 14 to each of its corners at one end thereof, placing the open end of a carton over the cabinet until the corner cushions 14 seat within the corners of the carton, inverting the carton and the cabinet, affixing a corner cushion 14 to the remaining corners of the cabinet, and then closing and sealing the carton. As indicated above, the corner cushions 14 will firmly and resiliently support the cabinet in a substantally suspended position within the carton, so that it is completely protected from damage.

Figure 7:
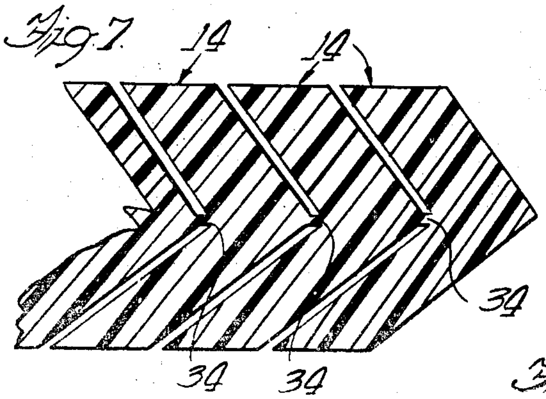
FIG. 7 is a transverse sectional view of a number of the corner cushions, illustrating the manner in which they are cut to form a long length of individually separable corner cushions.
Figure 8:
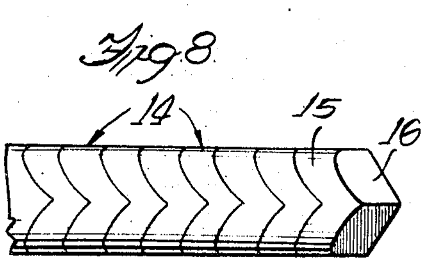
FIG. 8 is a side plan view of a number of connected corner members.
Figures 9, 10, 11, 12, 13:
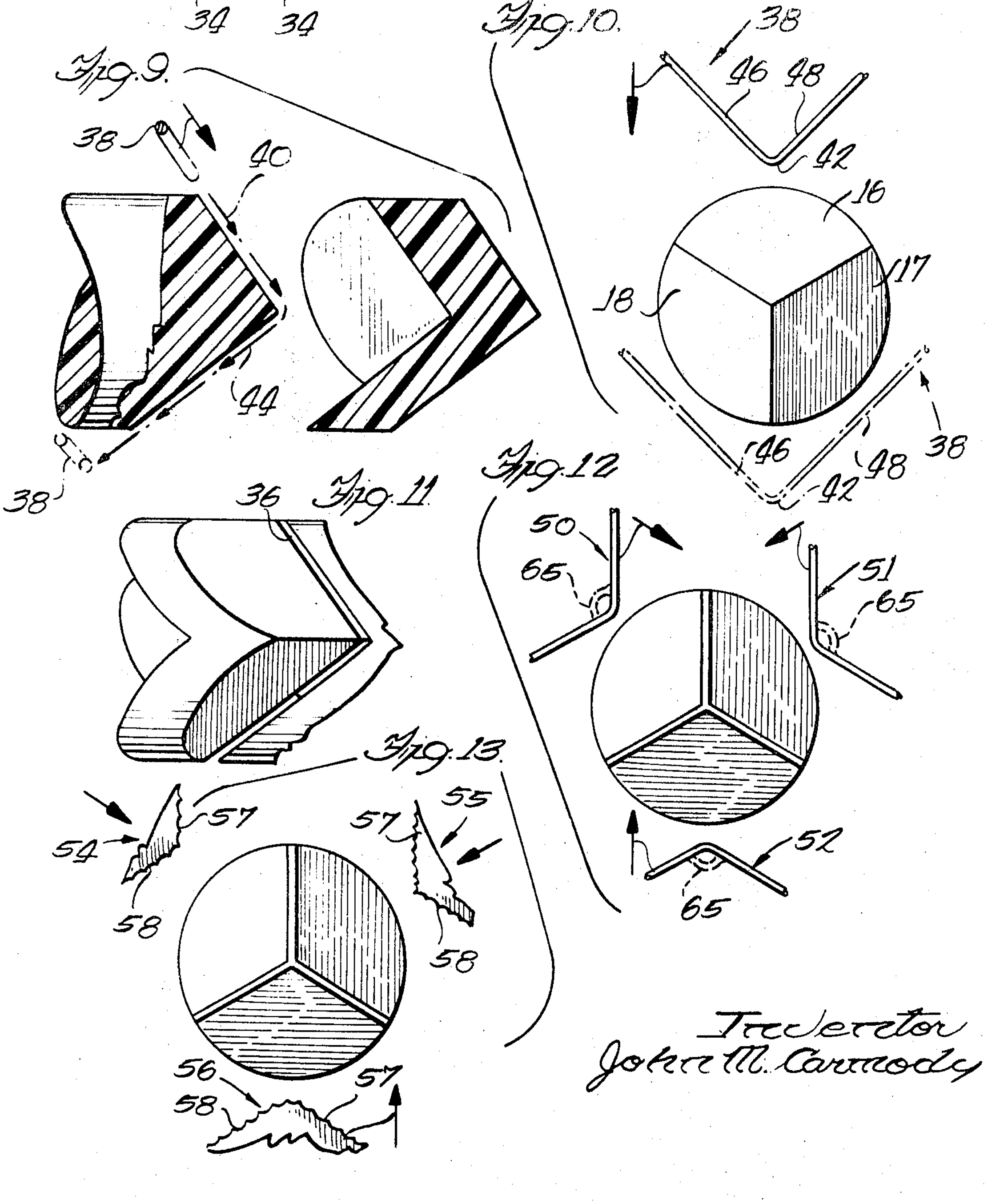
FIGS. 9 and 10 are a section view and an end plan view illustrating the manner in which the corner cushions are cut from a continuous length of material, using a hot wire.
FIG. 11 is a partial sectional view, illustrating the web sprues formed between the individual ones of the connected corner cushions.
FIG. 12 is an end plan view, illustrating the manner in which the corner cushions are cut from a long length of material, using three hot wires.
FIG. 13 is an end plan view, illustrating the manner in which the corner cushions are cut from a long length of material, using three saw blades.
Figures 14, 15:
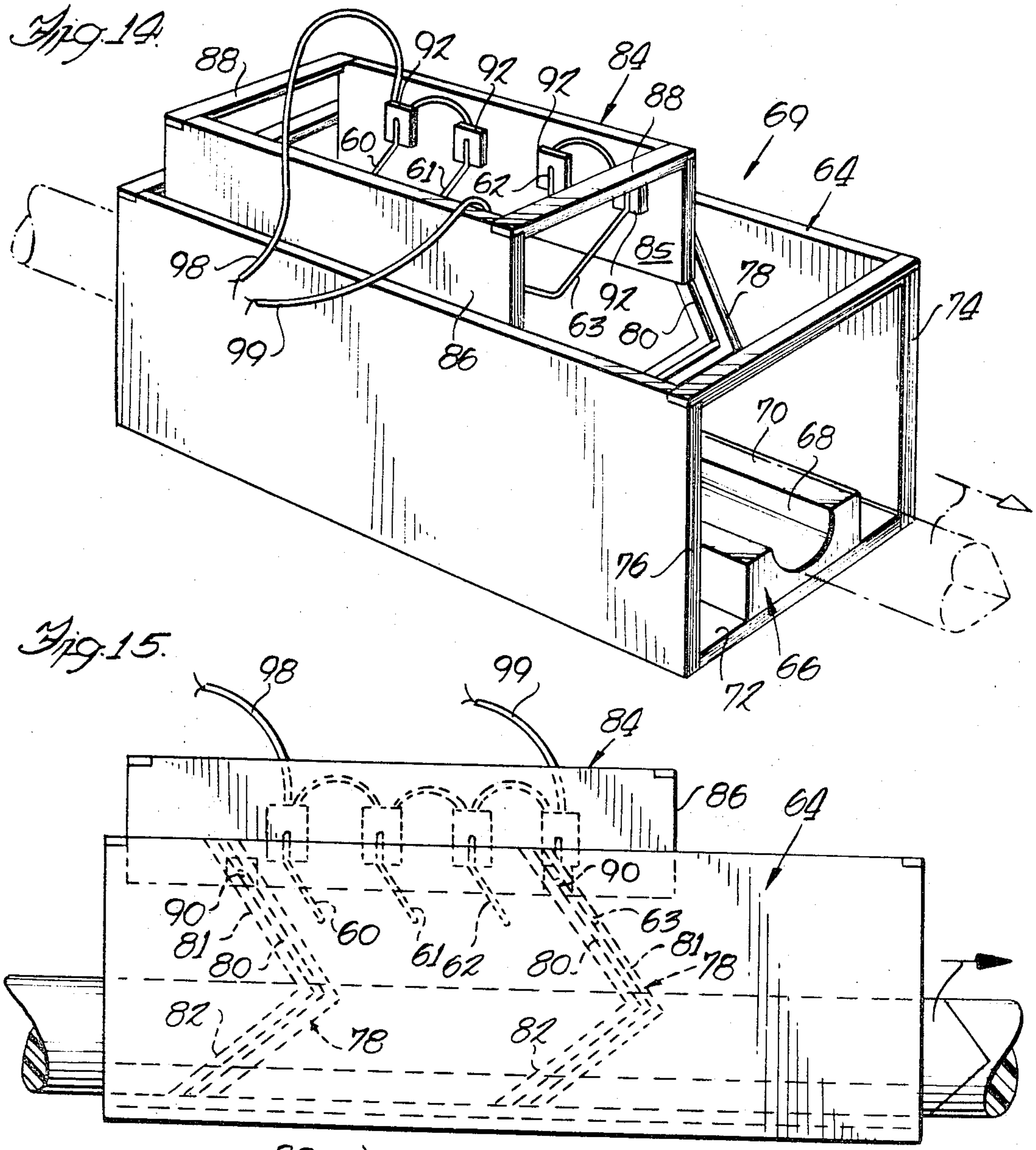
FIG. 14 is a perspective view of the apparatus used to cut the corner cushions from a continuous length of material.
FIG. 15 is a side plan view of the apparatus.
Figure 16:
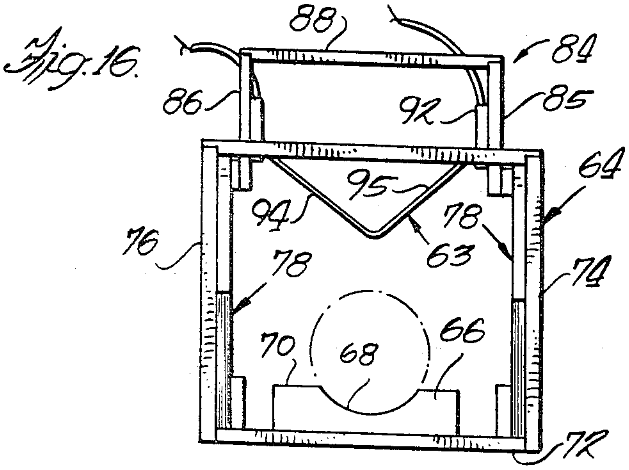
FIG. 16 is an end plan view of the apparatus.
Figures 17, 18, 19, 20:
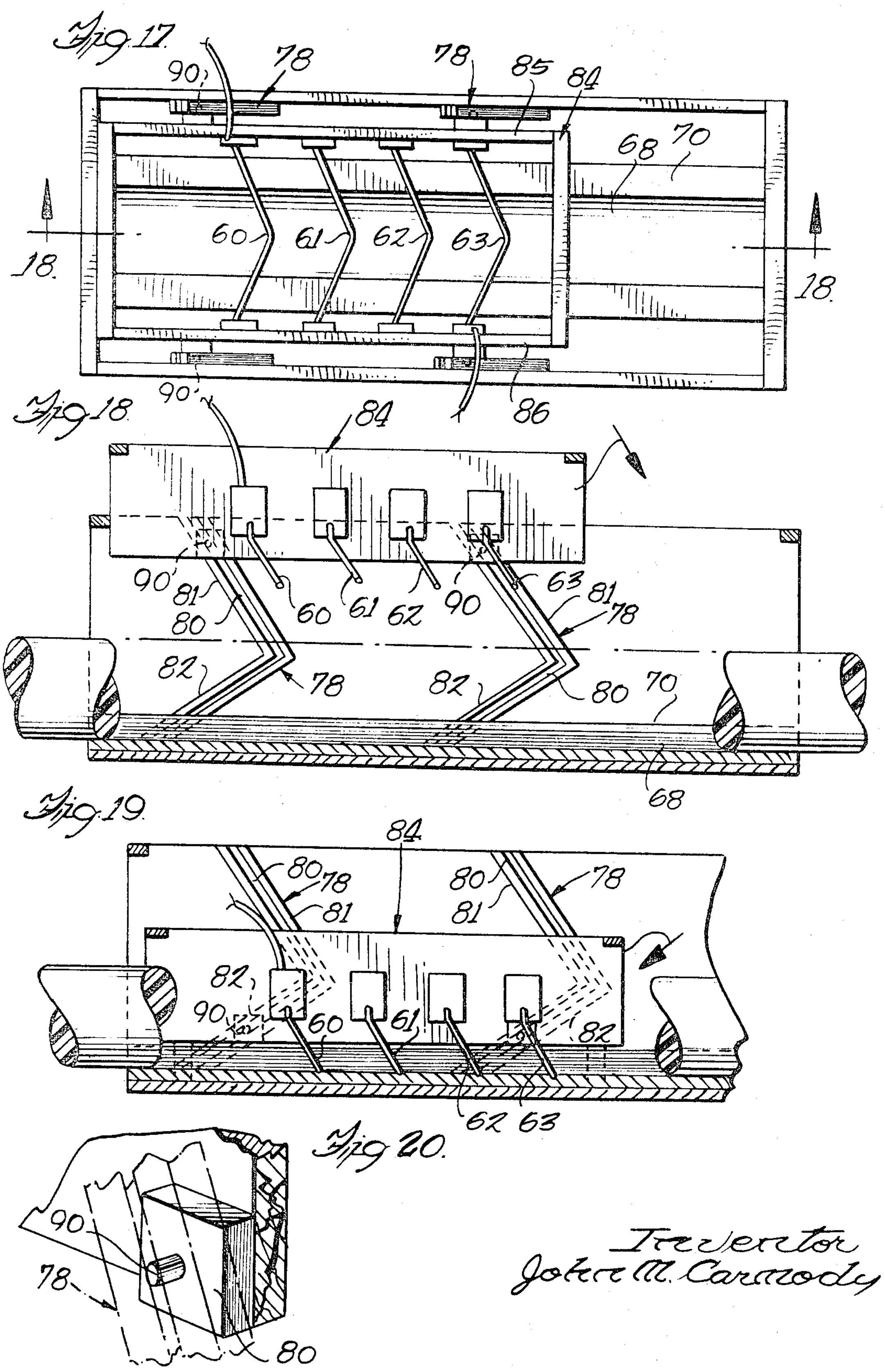
FIG. 17 is a top plan view of the apparatus.
FIG. 18 is a sectional view of the apparatus, taken along lines 18—18 of FIG. 17.
FIG. 19 is a similar sectional view of the apparatus, after its cutting head has been operated to cut a corner cushion from a continuous length of material.
FIG. 20 is a partial perspective view, illustrating the track-guide for the cutting head of the apparatus.

A number of the corner cushions 14 can be formed in a long length, for ease in shipping and/or storing them, as illustrated in FIGS. 7 and 8. Each of the individual corner cushions 14 are affixed to one another by a severable member which can be, for example, a tip sprue 34, at the points 19 and 24, as illustrated in FIG. 7, or by a web sprue 36, as illustrated in FIG. 11. The tip sprue 34 and the web sprue 36 are formed by not completely cutting or severing the individual corner cushions during the cutting operation, as explained below, and are of sufficient strength to hold the corner cushions together. The sprues can thereafter be easily broken, however, by pulling and/or twisting the corner cushions, to remove individual ones of the corner cushion for use, as desired.

In FIGS. 9 and 10, there is illustrated one manner in which the faces 16–18 can be formed on one corner cushion 14 and the faces 21–23 simultaneously formed in another corner cushion 14, using a V-shaped wire 38, best seen in FIG. 10. The wire 38 is electrically heated and then simultaneously lowered and moved forward, generally along the path defined by the arrows 40, until its tip 42 extends through approximately ½ the thickness of a length of the cylindrical-shaped material. Its direction of travel is then reversed so that the wire moves generally along the straight path defined by the arrows 44.

The two legs 46 and 48 of the wire 38 move in parallel planes as they traverse the path defined by the arrows 40 and cut, by melting the material, the face 16 on one corner cushion and the face 21 on another corner cushion. When the direction of travel of the wire 38 is reversed, the two legs 46 and 48 still move in parallel planes, along the path defined by the arrows 44, however, as can be seen in FIG. 10, being angularly disposed at a right angle to one another, the legs cut the respective faces 17 and 18. The faces 21–23, of course, also are simultaneously cut in the material. Accordingly, by using two wires 38 and moving them both in the same above-described fashion, one and one-half corner cushions 14 can be formed. Correspondingly, three wires 38 will form two corner cushions, four wires will form threee corner cushions, and so on.

In FIGS. 12 and 13, there are shown two additional methods for cutting the corner cushions 14 using three V-shaped wires 50–52 and three heated or saw blades 54–56, respectively. In accordance with the disposition of the inside and outside faces of the corner cushion, the wires are radially spaced 120° relative to one another, are located in planes which are at 90° to one another, and move along straight paths which are at angles to the longitudinal axis of the length of material. Each of the wires 50–52 is positioned and advanced into the material, to cut one of the faces 16–18 on one corner cushion (and simultaneously one of the faces 21–23 on another corner cushion). The heated or saw blades 54–56 each are substantially V-shaped and, if of the saw type, have serrated cutting edges 57 and 58 on them. These blades 54–56 are likewise positioned and advanced into the material, to cut respective ones of the faces 16–18 (and 21–23). If saw-type blades 54–56 are used, they preferably are oscillated while being advanced into the material, so as to have more effective cutting action. The three wires or blades form a set which together cut the material as described to form the three faces; and a number of such sets of cutting members may be employed to form a plurality of inside and outside faces along the length of material.

The tip sprue 34 between the individual ones of the corner cushions 14 can be provided, by using three V-shaped wires, each having the tip thereof reversely bent so as to project rearwardly between the two legs thereof, as illustrated by the dotted lines 65 in FIG. 12. The wires are extended, tip first, into the material generally in the manner described above. The wires can be moved into and out of the material, either one at a time or simultaneously. The corner cushions are not completely severed, as before, however, since the reversely bent tips 65 thereof do not intersect. Accordingly, a small, generally cylindrical-shaped tip sprue 34 is left between each of the individual ones of the corner cushions.

The web sprues 36 can be provided between the individual ones of the corner cushions 14, by moving the three hot wires 50–51 or the three heated or saw blades 54–56 into the material, until the adjacent edges of the respective ones of them are spaced approximately ⅛ to ¼ inch apart. In other words, the cutting edges of the wires, or the blades, are not overlapped or abutted so that the corner cushions are not completely severed, but are joined together with the narrow-in-width web sprues 36.

In FIGS. 14–17, cutting apparatus 69 including a number of V-shaped wires 60–63 which can be used to cut three complete corner cushions is illustrated. The cutting apparatus 69 includes a box-like frame 64 which is open at both ends and along its top. A generally rectangular-shaped support block 66 having a substantially semi-circular shaped groove 68 in its top wall 70 is affixed to the bottom wall 72 of the frame 64, centrally between its side walls 74 and 76. Affixed to each of the side walls 74 and 76 are two pairs of tracks 78, each having a guide slot 80 therein. These tracks 78 are of a right angle construction and are disposed so that the one leg 81 thereof is at an angle of approximately 55° from the top wall of the frame 64, with the right angled tip thereof projecting towards the right end (as illustrated) of the frame. The other leg 82 of each of the tracks 78 is disposed at angle of approximately 35° from the bottom wall of the frame.

The above-defined angular relationship of the legs 81 and 82 of the tracks 78 is preferred, however, other angular relationships also can be used to vary the thickness of the side walls of the corner cushions, as explained more fully below. In any case, however, the tracks 78 must form right angles.

A cutting head 84 having a pair of side walls 85 and 86 which are held in parallel spaced relation by end bars 88 is mounted between the side walls 74 and 76 of the frame 64. The cutting head 84 has a pair of guide pins 90 (FIG. 20) affixed to each of its side walls 85 and 86 which are slidably received within the guide slots 80 in respective ones of the tracks 78, so that the cutting head 84 can be moved downward within the frame 64, along the path defined by the guide slots 80 in the tracks 78.

The V-shaped wires 60–63 (four wires are illustrated, however, a greater or lesser number of them can be used) are affixed between the side walls 85 and 86 of the cutting head 84, by means of wire retaining blocks 92. These wires 60–63 each are disposed so the legs 94 and 95 (FIG. 16) thereof extend downwardly at an angle of approximately 55° with respect to the top wall of the frame 64, and with the pointed tips 96 thereof projecting toward the right end (as illustrated) of the frame, as can be best seen in FIG. 15.

The wires 60–63 function as electrical resistive heating elements and each is coupled to a source of electrical power (not shown), by means of a pair of conductors 98 and 99. The wires 60–63 are heated sufficiently to melt the foamed polyethylene, preferably at a temperature within the range of 600° to 900° F. so that a relatively fast, effective cutting speed which can be easily controlled can be used. Also, clean, relatively smooth surfaces on the faces of the corner cushions are provided.

In operation, the wires 60–63 are coupled to the source of power to heat them. A length of the cylindrical-shaped polyethylene material is placed within the cutting apparatus 69 and supported within the groove 68 in the support block 66. The cutting head 84 next is moved downwardly and forwardly along the path defined by the slot 80 in the leg 81 of the track 78. The wires 60–63 are thereby caused to engage and cut into (or melt) the polyethylene, to simultaneously cut the faces 16 and 21 on four corner cushions.

When the guide pins 90 reach the end of the slots 80 in the legs 81, the cutting head 84 and hence the wires 60–63 are caused to move backwardly and downwardly, by the slots 80 in the legs 82 of the tracks 78. During this movement, the faces 17, 18 and 22, 23 are simultaneously formed on four corner cushions. Three complete corner cushions are formed and can be removed from the cutting apparatus 69. The length of polyethylene material is then positionally advanced, to form additional corner cushions.

It is apparent that additional corner cushions can be simultaneously formed, by providing additional cutting wires. Also, the cutting apparatus can be easily automated, for fast, efficient operation so that the corner cushions can be easily and quickly formed.

If the corner cushions are to be formed in a continuous length of connected ones of the corner cushions, wires having the tips thereof appropriately formed, in the manner described above, are used. Also, additional cutting heads are provided, and adapted to be moved in the described fashion, to provide a severable member such as the tip sprues 34 or the web sprues 36 between the corner cushions.

As indicated above, the corner cushions 14 are preferably fabricated of foamed polyethylene since this material exhibits superior elastic memory and is sufficiently strong but yet resilient to withstand severe punishment and use. The corner cushions also can be cut from material which has a polygonal shape such as triangular or hexagonal so that the body portions 15 are correspondingly shaped. These shapes also can be easily extruded and have certain advantages over the cylindrical-shaped material. For example, there is some savings in material in using the triangular-shaped material and both of these shapes can be more easily and compactly packaged together for shipping and/or storage. This latter feature is particularly desirable when the corner cushions are formed connected together in long lengths.

The angular relationship of the tracks 78 within the cutting apparatus 69, as indicated above, can be varied to vary the thickness of the side walls of the corner cushions 14. For example, by having the legs 81 at a more acute angle, that is, nearly vertical, the thickness of the side wall between the faces 16 and 21 will be far more thick than the thickness of the side walls between the respective pairs of faces 17, 22 and 18, 23. By varying the thickness of the side walls in this fashion, greater spacing can be provided between the object and the carton, along the thicker face. As indicated, however, the legs 81 of the tracks 78 must be disposed at right angles to the legs 82, so that the faces 16–18 and 21–23 are properly spaced to form outside and inside corners, respectively.

It will thus be seen that the objects set forth above, among those made apparent from the preceding description, are efficiently attained, and since certain changes may be made in the above construction and article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A method of forming corner cushions having a body portion, a point on one end thereof forming an outside corner and an interior cavity forming an inside corner in the opposite end thereof comprising the steps of: forming a length of material; supporting said length of material; positioning at least one set of three cutting members having V-shaped cutting edges so that said cutting members are radially displaced 120° from one another and in planes which are at an angle of 90° with respect to one another; and moving each of said cutting members in a straight path into said length of material at an angle to the longitudinal axis of said length of material so that three faces are formed which lie in planes at right angles relative to one another so that said three faces forming said point on one end of one of said corner cushions may contact a container corner and said three faces forming said interior cavity in the opposite end of another one of said corner cushions may contact a product corner.

2. The method of claim 1, further including the steps of positionably advancing said length of material and again moving said cutting members to cut three additional faces in said length of material to form said interior cavity in the opposite end of said one corner cushion and said point on the one end of another one of said corner cushions.

3. The method of claim 1 further including the step of moving said cutting members into said length of material to a predetermined depth so as to not completely sever said length of material and to thereby form a web sprue between individual ones of said corner cushions, whereby a long length of connect corner cushions is provided.

4. The method of claim 1, wherein said cutting members comprise one set of three cutting blades.

5. The method of claim 1, wherein said cutting members comprise one set of three V-shaped wires which are heated to a temperature sufficient to cut said length of material.

6. The method of claim 1, wherein a plurality of corner cushions are formed in the length of material, said cushions being joined by a tip sprue between inside and outside corners, including the step of moving said cutting edges into the length of the material so that the tips thereof do not completely sever the length of the material between inside and outside corners.

References Cited

UNITED STATES PATENTS

| | | | |
|---|---|---|---|
| 2,106,274 | 1/1938 | Frayer et al. | 83—519X |
| 3,360,420 | 12/1967 | Paul et al. | 264—163X |
| 2,263,474 | 11/1941 | Scheibl | 25—105 |
| 2,465,398 | 3/1949 | Reddert et al. | 25—105X |
| 2,612,656 | 10/1952 | Lyon | 25—105X |
| 2,677,747 | 5/1954 | Jaye | 18—2 |
| 3,117,211 | 1/1964 | Tansey | 83—171 |

FOREIGN PATENTS

| | | | |
|---|---|---|---|
| 544,379 | 1932 | Germany | 83—51 |

ROBERT F. WHITE, Primary Examiner

J. H. SILBAUGH, Assistant Examiner

U.S. Cl. X.R.

18—2; 25—107; 83—7, 11, 48, 52, 171, 581; 264—154, 157